(12) United States Patent
Luo et al.

(10) Patent No.: US 12,272,011 B2
(45) Date of Patent: Apr. 8, 2025

(54) METHODS AND SYSTEMS FOR PRODUCING VOLUMETRIC CONTENT USING COMBINED FIXED AND DYNAMIC CAMERA SYSTEMS

(71) Applicant: Verizon Patent and Licensing Inc., Basking Ridge, NJ (US)

(72) Inventors: Liang Luo, Nutley, NJ (US); Tom Hsi Hao Shang, Forest Hills, NY (US); Vidhya Seran, Irving, TX (US); Elena Dotsenko, Princeton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 88 days.

(21) Appl. No.: 17/976,166

(22) Filed: Oct. 28, 2022

(65) Prior Publication Data
US 2024/0144606 A1 May 2, 2024

(51) Int. Cl.
*G06T 17/00* (2006.01)
*G06T 7/73* (2017.01)
*G06T 15/08* (2011.01)
*G06T 19/00* (2011.01)
*H04N 23/695* (2023.01)
*H04N 23/90* (2023.01)

(52) U.S. Cl.
CPC .............. *G06T 19/006* (2013.01); *G06T 7/73* (2017.01); *G06T 15/08* (2013.01); *H04N 23/695* (2023.01); *H04N 23/90* (2023.01); *G06T 2207/10024* (2013.01); *G06T 2207/10028* (2013.01); *G06T 2207/30196* (2013.01); *G06T 2207/30221* (2013.01)

(58) Field of Classification Search
CPC ...... G06T 19/006; G06T 15/08; H04N 23/695
See application file for complete search history.

(56) References Cited

U.S. PATENT DOCUMENTS

| | | | |
|---|---|---|---|
| 10,839,594 B2 * | 11/2020 | Besley ................. | H04N 13/243 |
| 2017/0318275 A1 * | 11/2017 | Khalid ................. | H04N 23/698 |
| 2020/0178851 A1 * | 6/2020 | Singhose ............. | A61B 5/1128 |
| 2023/0162398 A1 * | 5/2023 | Varekamp ........... | H04N 13/117 |
| | | | 348/187 |

OTHER PUBLICATIONS

Hilton et al., 3D-TV Production From Conventional Cameras for Sports Broadcast, IEEE Transactions on Broadcasting, vol. 57, No. 2, Jun. 2011, pp. 462-476 (Year: 2011).*

\* cited by examiner

*Primary Examiner* — Samantha (Yuehan) Wang

(57) ABSTRACT

An illustrative volumetric content production system may access first capture data and second capture data. These first capture data may represent an entirety of a capture target and may be captured by a fixed camera system including a first plurality of image capture devices having respective fixed viewpoints with respect to the capture target. The second capture data may represent a portion of the capture target less than the entirety of the capture target and may be captured by a dynamic camera system including a second plurality of image capture devices having respective dynamic viewpoints with respect to the capture target. Based on the first and second capture data, the volumetric content production system may generate a volumetric representation of an object included in the portion of the capture target in accordance with principles described herein. Corresponding methods and systems are also disclosed.

20 Claims, 8 Drawing Sheets

METHODS AND SYSTEMS FOR PRODUCING VOLUMETRIC CONTENT USING COMBINED FIXED AND DYNAMIC CAMERA SYSTEMS

BACKGROUND INFORMATION

Volumetric content representing three-dimensional objects and scenes may be produced for various purposes. As one example, certain content producers may create volumetric content to provide an extended reality experience, such as a virtual reality or augmented reality experience, with which users may engage (e.g., by way of a head-mounted extended reality presentation device, a mobile device, etc.). In some cases, such content may be produced based on data captured from a real-world scene in real time, such that a real-time extended reality experience associated with the real-world scene may be provided to users by streaming data representing the volumetric content in real-time as objects within the scene are captured and volumetric representations of the objects are generated. In other cases, preconstructed extended reality programs (e.g., analogous to video games or movies) may be similarly generated based on real-world scenes, and these may be streamed or otherwise transmitted to users for time-shifted extended reality experiences similar to the real-time extended reality experiences.

To produce volumetric content based on real-world objects and scenes (whether for a real-time or a time-shifted extended reality experience), image capture devices may be arranged at a scene and calibrated with respect to the scene and/or with respect to one another. As long as this calibration remains valid (e.g., as long as the image capture devices remain fixed and are not bumped or moved so as to invalidate the calibration), capture data such as color and depth data captured by these devices may be correlated and used for the production of volumetric content.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF EXAMPLE EMBODIMENTS

Figure 1:
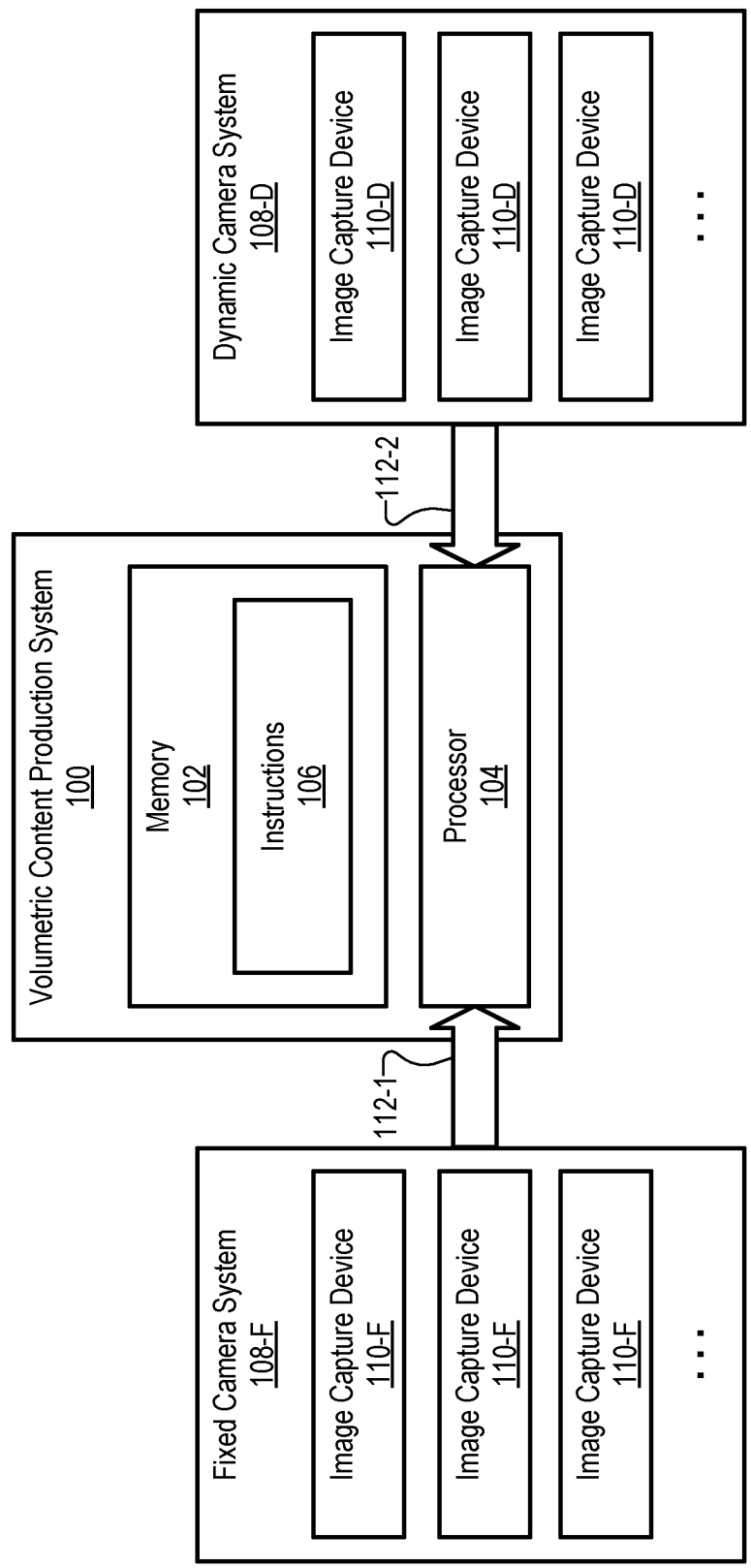
FIG. 1 shows an illustrative volumetric content production system configured to produce volumetric content using combined fixed and dynamic camera systems in accordance with principles described herein.

Methods and systems for producing volumetric content using combined fixed and dynamic camera systems are described herein. As mentioned above, volumetric content may be generated for various purposes, including for providing extended reality content such as incorporated in a virtual reality experience or an augmented reality experience. Generally, such content is produced on a relatively small scale using a fixed camera system that is calibrated prior to being used to capture data within a relatively small scene. For example, one traditional configuration could include an array of 6-8 image capture devices (also referred to herein as "cameras," though it will be understood that these cameras/image capture devices may generate images represented by color data and/or depth data) positioned in a circular arrangement 20 feet across. Each of these image capture devices could be located at a fixed position on the circle, and could have a fixed orientation trained inward toward the center of the circle and a fixed focal length of 50 mm (i.e., a fixed zoom level). This configuration might be effective at capturing data for volumetric content based on one or more objects (e.g., a human subject, etc.) that is located at or near the center of the circle. However, if the object were to be displaced by even a few feet (e.g., if the human subject took a step or two away from the circle's center), various challenges would arise that would complicate or compromise the volumetric content production for that object.

As one example, the fixed orientations and focal lengths in this example are such that the object, once displaced from the center of the circular scene, may no longer be in view for each of the image capture devices. As a result, it may become difficult or impossible to reconstruct a full and accurate volumetric representation of the object based on the data that is able to be captured (e.g., from just a few of the cameras that still have the object in view). For example, parts of the volumetric representation may be cut off or otherwise distorted in an undesirable way.

Even if the object stays in view of most or all of the cameras such that a full volumetric model can still be produced, other issues related to inconsistent and/or insufficient pixel density may arise as the object become increasingly displaced from the circle's center. First, the pixel density may become undesirably low for image capture devices that the object is moving away from. The fixed focal lengths of these cameras necessarily cause an object with a farther distance from a given camera to take up a smaller portion of the field of view of that camera (i.e., fewer pixels). This means that the camera has less detailed information associated with the object to work with than it would have if the object were centered in the scene, as well as less detailed information than other cameras may have to work with. Low pixel density may therefore lead to level-of-detail issues for parts of a volumetric reconstruction that are associated with data captured by these cameras that are relatively far away from the displaced object. On the other hand, the pixel density may become undesirably high for image capture devices that the object is moving toward in this scenario. Not only is there a level-of-detail mismatch that may create undesirable effects and artifacts in a volumetric representation of the object that is created, but having such a high amount of detail and information about the object may make it more difficult to reliably correlate data captured by different cameras (e.g., corresponding features from one image to another).

It may thus be understood that pixel density issues for even the small circular scene of this example scenario may create significant challenges. But much more significant difficulties may arise for other types of scenes (e.g., larger, non-circular scenes) that may be desirable to capture for certain applications using volumetric content. For instance, the level-of-detail and feature correspondence issues described above for an object that is somewhat off-center in a small circular scene may become prohibitively challenging for volumetric capture of a large, rectangular scene with many objects continuously moving throughout the scene (e.g., a playing field associated with a sporting event involving many players, etc.). Moreover, adding more image capture devices with fixed viewpoints (i.e., fixed positions, fixed orientations/angles, fixed focal length lenses/zoom levels) would not necessarily help address many of these issues. Wide angle (i.e., low focal length) lenses capable of capturing a large scene, for example, would not be able to provide sufficient levels of detail for objects in a large scene, while narrower angle (i.e., high focal length) lenses capable of capturing good detail for a portion of the scene, would not capture other areas of the scene, leading to the issues described above where objects would be able to easily move out of a target area where they could be adequately captured and modeled. If the volumetric content ultimately produced by this process is to be presented to users engaged in extended reality experiences, the user expectation may be that they can move freely to view objects at any location within the scene and that volumetric representations of objects should have consistently high levels of detail regardless of which perspective the user views the volumetric models from. In short, conventional fixed camera systems may be suboptimal or completely inadequate in many regards when it comes to capturing certain types of scenes and targets.

Accordingly, methods and systems described herein for producing volumetric content may do so using a combination of fixed and dynamic camera systems. As will be described below, a traditional fixed array of image capture devices may serve certain purposes (e.g., reliably locating objects in a scene, helping differentiate objects from other similar objects in the same vicinity through global object tracking, helping pose objects using joint tracking, etc.) and may be complemented by a dynamic array of image capture devices that may mitigate the various shortcomings described above for the fixed array on its own. As will be described in more detail, a dynamic camera system may include image capture devices that are calibrated in one state (e.g., with initial respective viewpoints) and that are capable of accurately and precisely tracking and reporting changes to their viewpoints (e.g., changes to their orientation as they pan, tilt, and roll; changes to their focal length as they zoom in and out, etc.) such that their calibrations can be dynamically updated to remain valid as the cameras dynamically focus on areas of interest in the scene. As one example, a fixed camera system may continuously capture an entire capture scene such as a large playing field, while a complementary dynamic camera system may follow the action of the game being played on the field (e.g., turning and zooming to continually capture detail of the players as they run up and down the field in the context of the game).

By corresponding these two systems in the ways described herein, various advantages and benefits may arise. For example, large scenes that are difficult or impossible to accurately capture with desirable detail using conventional techniques may be efficiently and successfully captured and volumetrically reconstructed. As a result, users may be presented with detailed, immersive, and enjoyable volumetric content associated with scenes of any scale, and all this may be accomplished with the flexibility of a reasonable number of image capture devices and in a scalable manner that does not require a capture target to have particular characteristics (e.g., a relatively small capture scene, etc.).

Various specific implementations will now be described in detail with reference to the figures. It will be understood that the specific implementations described below are provided as non-limiting examples and may be applied in various situations. Additionally, it will be understood that other examples not explicitly described herein may also fall within the scope of the claims set forth below. Methods and systems for producing volumetric content using combined fixed and dynamic camera systems may provide any of the benefits mentioned above, as well as various additional and/or alternative benefits that will be described and/or made apparent below.

FIG. 1 shows an illustrative volumetric content production system 100 ("system 100") configured to produce volumetric content using combined fixed and dynamic camera systems in accordance with principles described herein. System 100 may be implemented by computer resources such as processors, memory facilities, storage facilities, communication interfaces, and so forth. For example, system 100 may be implemented by multi-access edge compute (MEC) server systems (e.g., MEC systems operating on a provider network such as a cellular data network or other carrier network, etc.), cloud compute server systems (e.g., running containerized applications or other distributed software), on-premise server systems (e.g., configured to generate and provide volumetric content to client devices at a particular site such as a business or college campus), or other suitable computing systems as may serve a particular implementation.

System 100 may include memory resources configured to store instructions, as well as one or more processors communicatively coupled to the memory and configured to execute the instructions to perform functions described herein. For example, a generalized representation of system 100 is shown in FIG. 1 to include a memory 102 and a processor 104 selectively and communicatively coupled to one another. Memory 102 and processor 104 may each include or be implemented by computer hardware that is configured to store and/or execute computer software. Various other components of computer hardware and/or software not explicitly shown in FIG. 1 (e.g., networking and communication interfaces, etc.) may also be included within system 100. In some examples, memory 102 and processor 104 may be distributed between multiple devices and/or multiple locations as may serve a particular implementation.

Memory 102 may store and/or otherwise maintain executable data used by processor 104 to perform any of the functionality described herein. For example, memory 102 may store instructions 106 that may be executed by processor 104. Memory 102 may be implemented by one or more memory or storage devices, including any memory or storage devices described herein, that are configured to store data in a transitory or non-transitory manner. Instructions 106 may be executed by processor 104 to cause system 100 to perform any of the functionality described herein. Instructions 106 may be implemented by any suitable application, software, script, code, and/or other executable data instance. Additionally, memory 102 may also maintain any other data accessed, managed, used, and/or transmitted by processor 104 in a particular implementation.

Processor 104 may be implemented by one or more computer processing devices, including general-purpose processors (e.g., central processing units (CPUs), graphics processing units (GPUs), microprocessors, etc.), special-purpose processors (e.g., application-specific integrated circuits (ASICs), field-programmable gate arrays (FPGAs), etc.), or the like. Using processor 104 (e.g., when processor 104 is directed to perform operations represented by instructions 106 stored in memory 102), system 100 may perform functions associated with producing volumetric content using combined fixed and dynamic camera systems in accordance with methods and systems described herein and/or as may serve a particular implementation.

As further illustrated in FIG. 1, system 100 may be associated with one or more camera systems such as a fixed camera system 108-F and a dynamic camera system 108-D (referred to collectively as camera systems 108). In some examples, the association between system 100 and camera systems 108 may be a very close association, such as that an implementation of system 100 includes and has direct control of one or both camera systems 108. For instance, an implementation of system 100 may include the fixed camera system 108-F, which itself may include a first plurality of image capture devices 110-F having respective fixed viewpoints with respect to a capture target, and the dynamic camera system 108-D, which may include a second plurality of image capture devices 110-D having respective dynamic viewpoints with respect to the capture target. In other examples, the association between system 100 and camera systems 108 may be less direct, such as in a case where system 100 is communicatively coupled to one or both camera systems 108 to receive capture data therefrom, but where system 100 does not necessarily have control (or at least full control) of the camera systems.

Whatever the association is with system 100, both camera systems 108 may include respective image capture devices 110 (i.e., fixed-viewpoint image capture devices 110-F and dynamic-viewpoint image capture devices 110-D) that are configured to capture and provide capture data 112 to be processed by system 100 (e.g., using processor 104). More particularly, as shown, first capture data 112-1 may be generated by image capture devices 110-F of fixed camera system 108-F, while second capture data 112-2 may be generated by image capture devices 110-D of dynamic camera system 108-D. All of capture data 112 (i.e., both first and second capture data 112-1 and 112-2) may be provided to system 100 (e.g., to processor 104, in particular) to be analyzed and processed thereby. For example, the first and second pluralities of image capture devices 110-F and 110-D may be implemented by image capture devices configured to capture color and depth data, the first and second capture data 112-1 and 112-2 accessed by system 100 may include color and depth data, and the processing performed by processor 104 may involve analyzing the color and depth data to produce volumetric content in the ways described herein.

Figure 2:
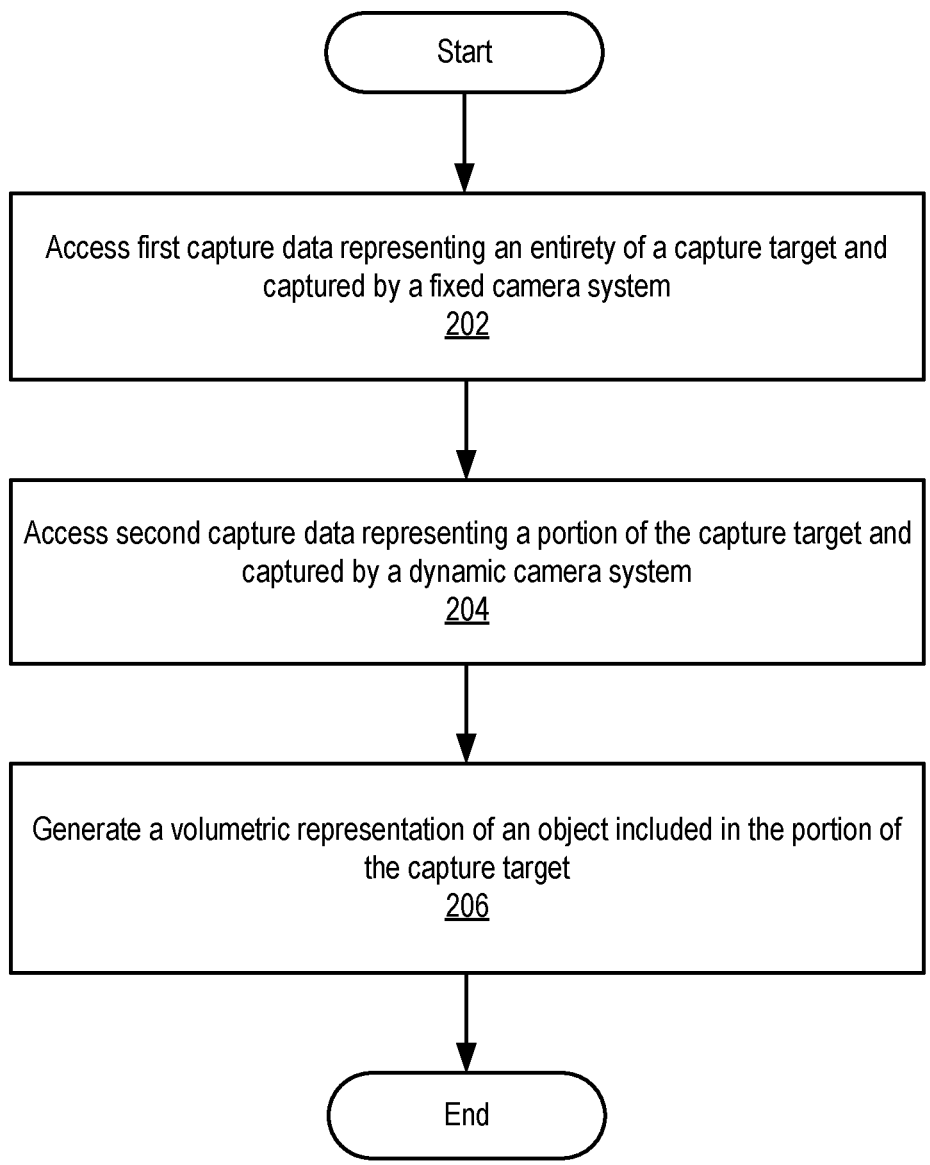
FIG. 2 shows an illustrative method for producing volumetric content using combined fixed and dynamic camera systems.

As one example of a process that processor 104 may perform, FIG. 2 shows an illustrative method 200 for producing volumetric content using combined fixed and dynamic camera systems such as camera systems 108. While FIG. 2 shows illustrative operations according to one implementation, other implementations may omit, add to, reorder, and/or modify any of the operations shown in FIG. 2. In some examples, multiple operations shown in FIG. 2 or described in relation to FIG. 2 may be performed concurrently (e.g., in parallel) with one another, rather than being performed sequentially as illustrated and/or described. One or more of the operations shown in FIG. 2 may be performed by a volumetric content production system such as system 100 and/or any implementation thereof.

In certain examples, operations of method 200 may be performed in real time so as to provide, receive, process, and/or use data described herein immediately as the data is generated, updated, changed, exchanged, or otherwise becomes available (e.g., accessing and processing streams of capture data as the capture target changes and the capture data is generated). In such examples, certain operations described herein may involve real-time data, real-time representations, real-time conditions, and/or other real-time circumstances. As used herein, "real time" will be understood to relate to data processing and/or other actions that are performed immediately, as well as conditions and/or circumstances that are accounted for as they exist in the moment when the processing or other actions are performed. For example, a real-time operation may refer to an operation that is performed immediately and without undue delay, even if it is not possible for there to be absolutely zero delay. Similarly, real-time data, real-time representations, real-time conditions, and so forth, will be understood to refer to data, representations, and conditions that relate to a present moment in time or a moment in time when decisions are being made and operations are being performed (e.g., even if after a short delay), such that the data, representations, conditions, and so forth are temporally relevant to the decisions being made and/or the operations being performed.

Each of operations 202-206 of method 200 will now be described in more detail as the operations may be performed by an implementation of system 100 (e.g., by processor 104 executing instructions 106 stored in memory 102).

At operation 202, a volumetric content production system (e.g., system 100) may access first capture data (e.g., capture data 112-1) captured by a fixed camera system (e.g., fixed camera system 108-F) that includes a first plurality of image capture devices (e.g., image capture devices 110-F). The image capture devices of the fixed camera system may have respective fixed viewpoints with respect to a capture target (e.g., an object, a scene including a number of objects, etc.).

As will be illustrated and described in more detail below, a viewpoint of an image capture device may refer to combination of several aspects of what the image capture device is configured to capture of a capture target. Specifically, as used herein, a viewpoint of an image capture device may refer, for a particular moment in time, to a combination of the position of the image capture device in space (e.g., with respect to the capture target), the orientation of the image capture device with respect to the capture target, and the focal length (e.g., an amount of zoom or a "zoom level") of the image capture device. These various characteristics of the image capture device may define what the image capture device views and is able to capture at a given point in time. Accordingly, in the case of this first plurality of image capture devices having respective fixed viewpoints with respect to the capture target, the positions, orientations, and focal lengths of each of these image capture devices may be fixed (i.e., unchanging after being set up and calibrated) as data representative of the capture target is captured.

The first capture data accessed at operation 202 and captured by the fixed camera system may represent an entirety of the capture target. As used herein, an entirety of the capture target may be defined so as to refer to one or more objects or areas that the fixed camera system would volumetrically capture in its fixed arrangement (i.e., with the fixed viewpoints of the first plurality of image capture devices). For example, if the fixed camera system is arranged with respect to a scene such as a playing field where a sporting event is taking place, and if this arrangement is such that each point on the playing field is captured by several or all of the image capture devices of the first plurality of image capture devices, the playing field (including human subjects such as players involved in the sporting event and/or other objects on the field) may serve as the capture target. Whatever portion of the field is captured by the fixed camera system in a manner that would allow for at least some degree of volumetric modeling (e.g., whatever portion is captured from multiple angles of cameras in the fixed camera system and notwithstanding that a resultant volumetric representation based only on capture data from this fixed camera system would suffer from certain deficiencies described above) may be considered the entirety of the capture target.

At operation 204, the volumetric content production system (e.g., system 100) may access second capture data (e.g., capture data 112-2) captured by a dynamic camera system (e.g., dynamic camera system 108-D) that includes a second plurality of image capture devices (e.g., image capture devices 110-D). The image capture devices of the dynamic camera system may have respective dynamic viewpoints with respect to the capture target (i.e., the same capture target described above in relation to operation 202 as being captured by the fixed capture system).

As described above, a viewpoint of an image capture device may refer to a combination of characteristics of the image capture device (e.g., the position, orientation, and focal length of the image capture device) that collectively define what the image capture device captures of a capture target at a given point in time. Accordingly, in the case of this second plurality of image capture devices having respective dynamic viewpoints with respect to the capture target, at least one of the positions, the orientations, and/or the focal lengths of each of these image capture devices may be dynamic (i.e., able to change after being set up and calibrated) as data representative of the capture target is captured.

The second capture data accessed at operation 204 and captured by the dynamic camera system may represent a portion of the capture target less than the entirety of the capture target. Since the entirety of the capture target may be defined so as to refer to one or more objects or areas that the fixed camera system would volumetrically capture in its fixed arrangement, as described above, the portion of the capture target less than the entirety represented by the second capture data will be understood to represent a view of just part of the capture target. For example, this view may be narrower and more detailed than captured views of the entire capture target. For instance, in the example described above in which the capture target is a playing field where a sporting event is taking place, the portion of the capture target represented by the second capture data accessed at operation 204 may be a part of the field where some or all of the players and/or relevant action of the game is occurring at a given time. For instance, if the sporting event is an American football game, gameplay at a particular point in time may be concentrated around a line of scrimmage that is near one end of the field, and the rest of the field may be empty at this time. Accordingly, while the fixed camera system may continue to cover the entire field, the cameras of the dynamic camera system at this time may be configured to focus in on the relatively limited portion of the field where the players are located and the gameplay is concentrated.

At operation 206, the volumetric content production system (e.g., system 100) may generate a volumetric representation of an object included in the portion of the capture target. This may be performed based on both the first capture data accessed at operation 202 (the fixed-viewpoint capture data representing a wider view of the entire capture target) and the second capture data accessed at operation 204 (the dynamic-viewpoint capture data representing a narrower and more detailed view of the object within a particular portion of the capture target). The object for which the volumetric representation is generated at operation 206 may be any suitable object included within the portion of the capture target. For instance, in the example of the playing field described in relation to operations 202 and 204, the object may be a human subject (e.g., one player on the field) or a grouping of human subjects (e.g., a plurality of players nearby one another on the field). The volumetric representation of the object may be implemented by any type of volumetric model represented in any suitable way using any suitable format. For example, a polygonal mesh may be generated based on depth data incorporated in the first and/or second capture data and the mesh may be textured using visual details derived from color data incorporated in the first and/or second capture data, as will be described in more detail below.

The example of a relatively large capture target (e.g., a playing field associated with a sporting event) with various distinct objects (e.g., human subjects playing on the field and/or other objects on the field) has been described in the examples above and will be further described and illustrated in more detailed examples below. However, it will be understood that while these implementations are provided as examples for convenience of description and illustration, the principles described herein need not be limited to such implementations. As another type of implementation that may similarly be served by principles described herein, consider a capture target comprising the body of a single human subject. In this example, the entirety of the capture target may be the entire body of the human subject and the objects included in different portions of the capture target (portions less than the entirety) may be various body parts of the human subject such as the head (or face), torso, arms, legs, hands, feet, and so forth. More particularly, in this implementation, the capture target may be a body of a human subject, the portion of the capture target at a particular time is a body part of the human subject, and the volumetric representation of the object is a volumetric representation of the body part of the human subject (e.g., a model of the arm that may be configured to attach, by way of a joint, to a model of the torso, etc.).

For this type of implementation, similar principles that will be described below for larger capture targets (e.g., larger scenes such as playing fields, etc.) may be applied to create detailed volumetric representations of smaller capture targets such as human bodies. For example, upon detecting an object (e.g., a human body) using a fixed camera system, system 100 may direct the dynamic camera system to zoom in on the object, detect and segment various parts of the body (e.g., based on joint tracking, a machine learning model of the body, etc.), switch to a higher resolution camera, and adjust the viewpoint of the camera (e.g., tilting, zooming, adjusting the position of the high resolution camera, etc.) so as to capture each part of the body in sufficient detail to be able to construct an accurate and detailed volumetric representation of the body.

Figure 3:
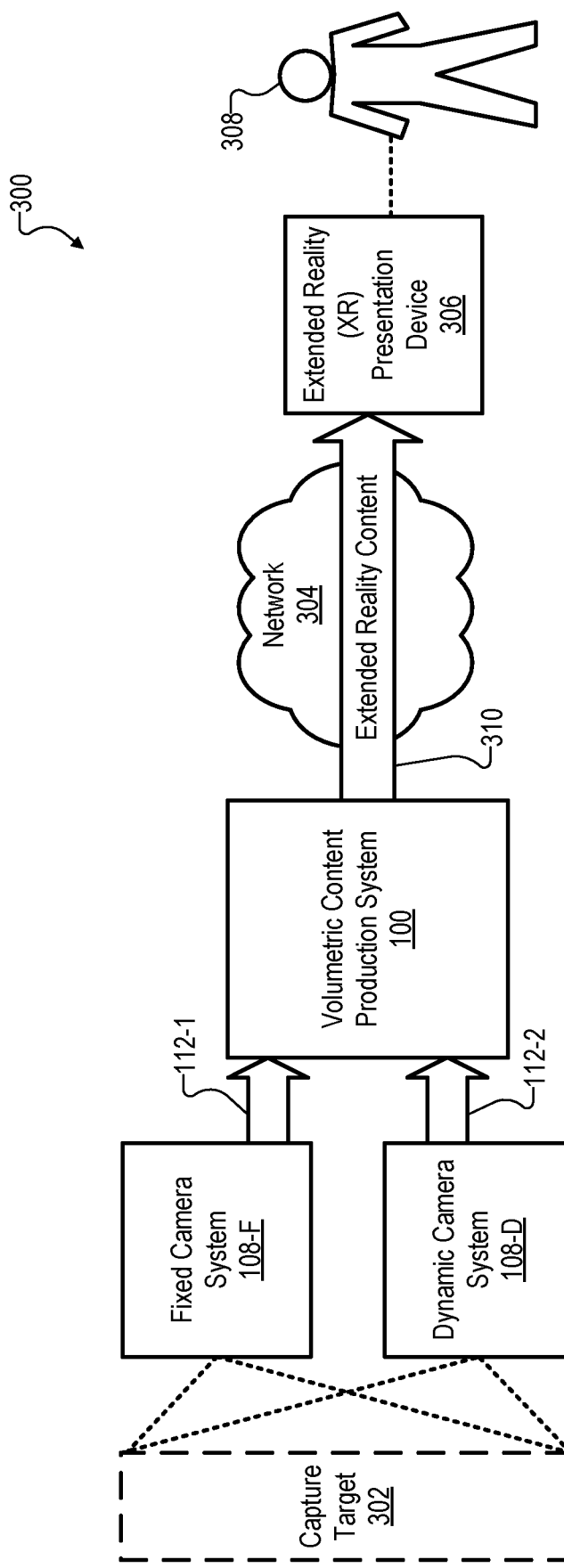
FIG. 3 shows an illustrative configuration in which the volumetric content production system of FIG. 1 may operate to produce volumetric content using combined fixed and dynamic camera systems.

FIG. 3 shows an illustrative configuration 300 in which system 100 may operate to implement volumetric content production using combined fixed and dynamic camera systems. As shown, FIG. 3 includes many of the same elements described above, each of which may operate in the same or similar ways as have been described. For instance, volumetric content production system 100, fixed camera system 108-F (which provides first capture data 112-1 to system 100), and dynamic camera system 108-D (which provides second capture data 112-2 to system 100) may function in the ways described above. Additionally, configuration 300 explicitly shows a capture target 302 that is captured by both camera systems 108 (as indicated by dotted lines extending from camera systems 108 to suggest a field of view of the camera systems being associated with capture target 302), a network 304 by way of which system 100 is communicatively coupled with an extended reality (XR) presentation device 306 used by a user 308, and extended reality content 310 provided by system 100 to XR presentation device 306 (by way of network 304). Each of the components of configuration 300 will now be described other than those already described above in detail.

As described above, capture target 302 may be implemented by any object, group of objects, scene (which may include one or more objects), or other physical target that camera systems 108 may be configured to monitor and capture (e.g., under direction from system 100). As has been mentioned and as will be illustrated in additional examples below, for instance, capture target 302 may be implemented by a scene that includes a set of human subjects, while the portion of capture target 302 captured dynamically at a particular time may be implemented as a portion of the scene in which one or more of the set of human subjects is located at the particular time. More particularly, as one example, this scene of capture target 302 may be a playing field on which a sporting event is being played and the set of human subjects may include a set of players engaged in the sporting event on the playing field. In other examples, other types of scenes (e.g., a stage where a concert or theatrical performance is taking place, a set for a film or television show where actors are performing, etc.) may similarly include one or more human subjects that are to be captured in like manner. In any of these examples, a volumetric representation of an object from capture target 302 (which may be generated by system 100) may be implemented as a volumetric representation of one human subject from the set of human subjects. Additionally, as described above, still other examples of capture target 302 may include targets smaller than a scene (e.g., a human subject in which different body parts implement the different objects included in the capture target).

Network 304 may serve as a data delivery medium by way of which data may be exchanged between a server domain (in which system 100 is included) and a client domain (in which XR presentation device 306 is included). For example, network 304 may be implemented by any suitable private or public networks (e.g., a provider-specific wired or wireless communications network such as a cellular carrier network operated by a mobile carrier entity, a local area network (LAN), a wide area network, the Internet, etc.) and may use any communication technologies, devices, media, protocols, or the like, as may serve a particular implementation.

XR presentation device 306 may represent any device used by user 308 to view volumetric representations of objects generated by system 100 and included within extended reality content 310 sent to XR presentation device 306 over network 304. For instance, in certain examples, XR presentation device 306 may include or be implemented by a head-mounted extended reality device that presents a fully-immersive virtual reality world, or that presents an augmented reality world based on the actual environment in which user 308 is located (but adding additional augmentations such as volumetric object representations produced and provided by system 100). In other examples, XR presentation device 306 may include or be implemented by a mobile device (e.g., a smartphone, a tablet device, etc.) or another type of media player device such as a computer, a television, or the like.

System 100 may provide volumetric representations of one or more objects (e.g., objects included in capture target 302) for presentation within an extended reality experience that is presented to user 308 by way of XR presentation device 306. To this end, a data stream encoding extended reality content 310 may be transmitted by way of network 304 to XR presentation device 306 so that extended reality content 310 may be presented by the device to the user. Extended reality content may include any number of volumetric representations of objects and/or other such content that allows the content, when presented by XR presentation device 306, to provide user 308 with an extended reality experience involving the volumetric object representations. For example, if capture target 302 is a playing field where a sporting event is taking place and the objects represented volumetrically in extended reality content 310 are players involved in the sporting event, the extended reality experience presented to user 308 may allow user 308 to immerse himself or herself in the sporting event such as by virtually standing on the playing field, watching the players engage in the event from a virtual perspective of the user's choice (e.g., right in the middle of the action, etc.), and so forth.

Figure 4B:
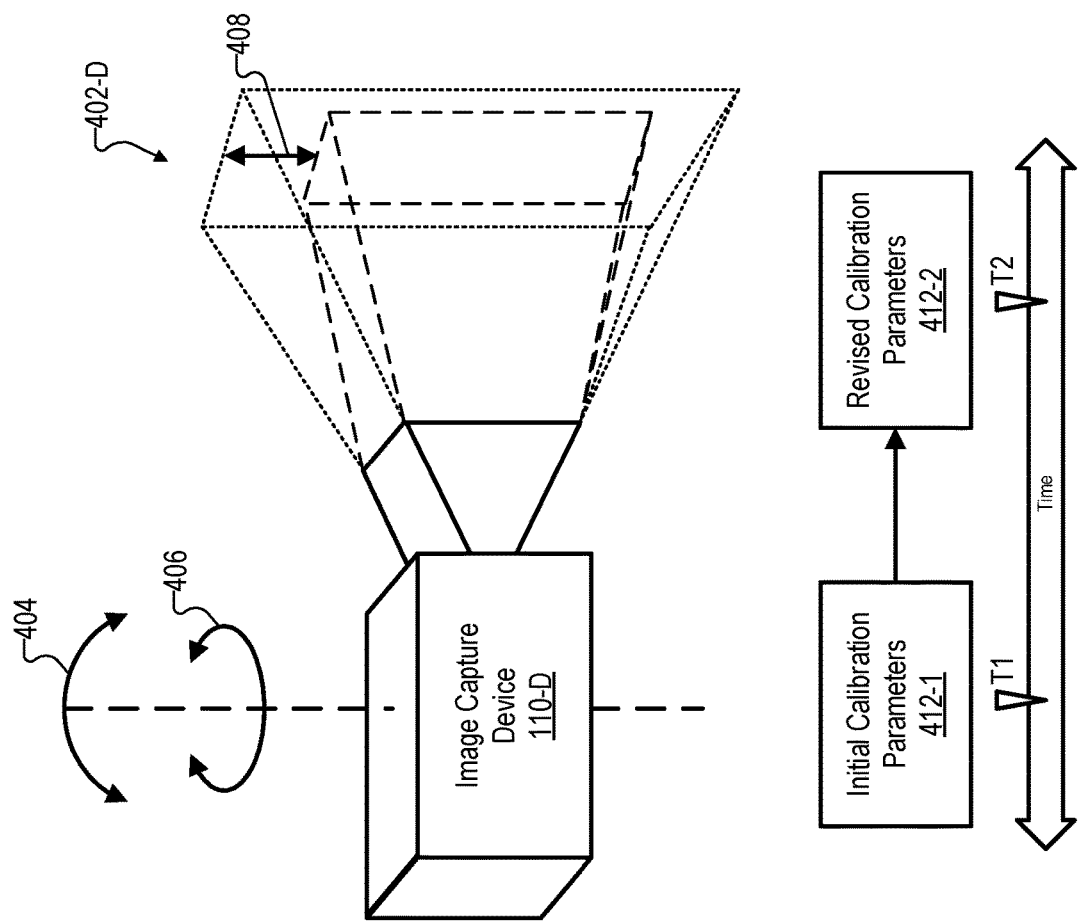
FIG. 4B shows illustrative aspects for calibrating an example image capture device used in a dynamic camera system configured for use with volumetric content production systems described herein.
Figure 4A:
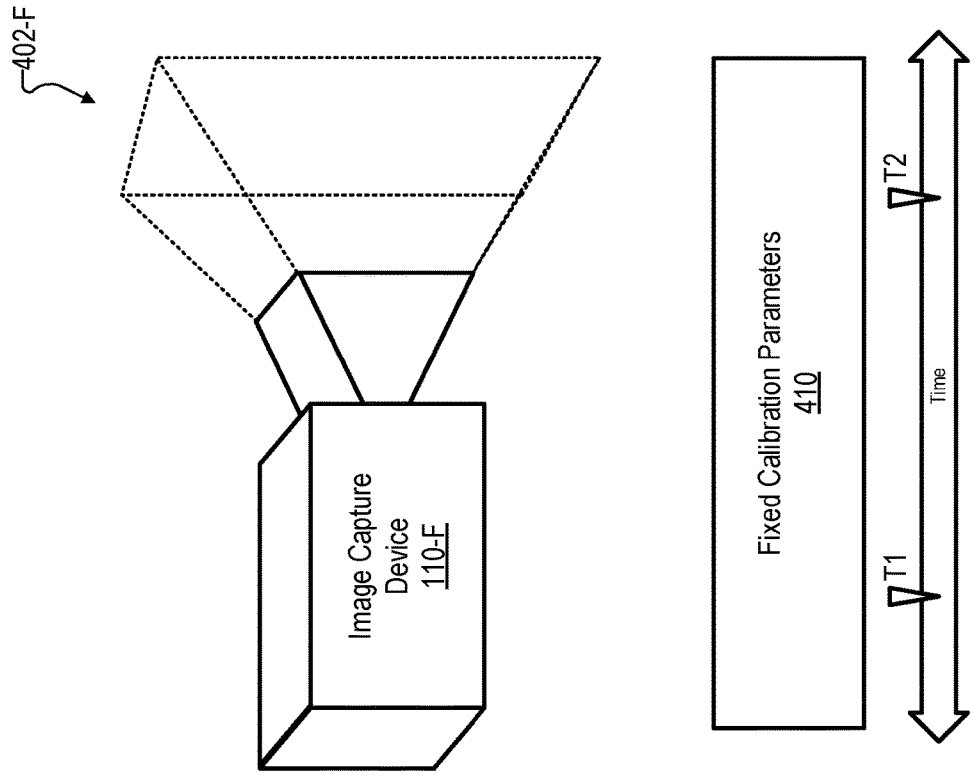
FIG. 4A shows illustrative aspects for calibrating an example image capture device used in a fixed camera system configured for use with volumetric content production systems described herein.

FIG. 4A shows illustrative aspects for calibrating an example image capture device 110-F used in a fixed camera system configured for use with volumetric content production systems described herein (e.g., fixed camera system 108-F used with system 100). Specifically, as shown, image capture device 110-F is shown in FIG. 4A to have a viewpoint 402-F that will be understood to be a fixed viewpoint. As described above, a viewpoint of an image capture device, as that term is used herein, may refer to an apparent distance (e.g., a zoom level or focal length) of the image capture device, as well as to the position and orientation (e.g., angle, perspective, etc.) of the image capture device with respect to the capture target being captured.

Specific characteristics of viewpoint 402-F may be accounted for by system 100 when capture data provided by this image capture device 110-F is used, so that, for example, the capture data provided by this image capture device 110-F may be properly correlated with capture data provided by other image capture devices 110-F in the fixed camera system 108-F and/or image capture devices 110-D in the dynamic camera system 110-D. Accordingly, these characteristics may be represented in a set of parameters referred to as fixed calibration parameters 410. Fixed calibration parameters 410 may include both intrinsic calibration parameters that define characteristics of the camera itself (e.g., the focal length of the camera, how the camera may distort an image compared to an ideal pinhole camera model, etc.) as well as extrinsic calibration parameters that define characteristics of the camera as it relates to a capture target and/or to other cameras in the fixed camera system 108-F (e.g., the position of the camera, the angle or orientation of the camera, etc.). As shown with respect to a timeline on which two specific points in time, T1 and T2, are labeled, fixed calibration parameters 410 may be fixed and unchanging. For example, time T1 may represent a time shortly after image capture device 110-F is initially calibrated (e.g., a time when fixed calibration parameters 410 are determined based on viewpoint 402-F), while time T2 may represent a later time when image capture device 110-F is operating to capture images of a capture target that is being represented volumetrically. At both of these times, fixed calibration parameters 410 are shown to be the same since viewpoint 402-F is a fixed viewpoint.

In contrast, FIG. 4B shows illustrative aspects for calibrating an example image capture device 110-D used in a dynamic camera system configured for use with volumetric content production systems described herein (e.g., dynamic camera system 108-D used with system 100). Instead of the fixed viewpoint of image capture device 110-F, image capture device 110-D is shown in FIG. 4B to have a viewpoint 402-D that will be understood to be a dynamic viewpoint. As has been described, a dynamic viewpoint may be distinguished from a fixed viewpoint due to the various ways that the viewpoint may change during a capture session. For example, image capture device 110-D (as well as other image capture devices 110-D in dynamic camera system 108-D) may be configured to dynamically change dynamic viewpoint 402-D by way of a tilting action, a panning action, a zooming action, and/or other suitable actions (e.g., a rolling or twisting action, a lateral position change, etc.). As such, while fixed viewpoint 402-F remains the same throughout a time period associated with operation of system 100 (e.g., a capture session), dynamic viewpoint 402-D shows that various characteristics of the viewpoint that may change during this time including a tilt characteristic 404 (associated with the tilting action), a rotation characteristic 406 (associated with the panning action), a focal length characteristic 408 (associated with the zooming action), and/or other suitable characteristics as may be applicable in certain implementations (not explicitly shown).

Similarly as described above for the characteristics of image capture device 110-F, the various characteristics of viewpoint 402-D may be accounted for by system 100 when capture data provided by this image capture device 110-D is used. Again, in this way, the capture data provided by this image capture device 110-D may be properly correlated with capture data provided by other image capture devices 110-F and/or 110-D in the camera systems 108. Characteristics 404-408 (as well as other suitable characteristics) may be represented in a set of calibration parameters similar to fixed calibration parameters 410 described above (e.g., including intrinsic parameters, extrinsic parameters, etc.). However, since the characteristics of image capture device 110-D may be continually changing over time, the calibration parameters may likewise be continually updated to reflect how the characteristics are adjusted.

To illustrate, a similar timeline as the one described in relation to FIG. 4A is shown in FIG. 4B with the same two specific points in time, T1 and T2. However, whereas fixed calibration parameters 410 were shown to remain unchanged from time T1 (e.g., a time shortly after the image capture devices are initially calibrated) until time T2 (e.g., a later time when the image capture devices are operating to capture images of a capture target that is being represented volumetrically), FIG. 4B shows that image capture device 110-D may be dynamically recalibrated to revise the calibration parameters as viewpoint 402-D changes. More specifically, as shown, at first time TI (e.g., prior to performance of a panning action, tilting action, or zooming action), system 100 may calibrate dynamic camera system 108-D to determine an initial set of calibration parameters 412-1 for each image capture device 110-D (including the image capture device 110-D shown in FIG. 4B and other devices in the camera system not shown in this figure). Then, at a second time T2 (e.g., subsequent to the performance of one or more panning actions, tilting actions, and/or zooming actions), system 100 may dynamically recalibrate dynamic camera system 108-D to determine a revised set of calibration parameters 412-2 for each of the image capture devices 110-D. In FIG. 4B, it will be understood that initial calibration parameters 412-1 and revised calibration parameters 412-2 may be set to different values to reflect that viewpoint 402-D is a dynamic viewpoint that has changed from time T1 to time T2.

While an initial calibration of fixed camera system 108-F and dynamic camera system 108-D may be performed prior to time T1 (e.g., prior to operation of system 100 to produce volumetric content in a capture session), continual recalibrations of dynamic camera system 108-D may be performed at later times as the target is being captured and as volumetric content is being produced (e.g., including at time T2 and other times associated with other changes to dynamic viewpoints such as viewpoint 402-D). To this end, image capture devices 110-D may be implemented by image capture devices that are configured to track and provide state data associated with the dynamic viewpoint of the image capture device (e.g., viewpoint 402-D in the case of the image capture device 110-D illustrated in FIG. 4B) during a performance of panning actions, tilting actions, zooming actions, and so forth. For example, such state data may indicate with high precision and accuracy exactly how characteristics of dynamic viewpoint 402-D (including characteristics 404-408) change whenever adjustments to the dynamic viewpoint occur. Image capture device 110-D may indicate, for example, that image capture device 110-D has been tilted upward by 2.5 degrees, or has been panned 21 degrees to the left, or has been zoomed in by 2.8× (e.g., that the focal length has been lengthened by 1.6 mm, etc.), or that some other aspect of the state of image capture device 110-D has changed by a certain amount. The dynamic recalibration at time T2 that results in revised calibration parameters 412-2 may thus be triggered by changes to such state data (indicating that a change has been made and recalibration is called for) and may be based on the revised state data, so that a full calibration procedure does not necessarily need to be performed. It will be understood that changes to dynamic viewpoint 402-D that trigger calibration parameters 412 to be revised may include changes to any of the characteristics that have been described (e.g., including characteristics 404-408) or any combination thereof (including changes to all of the characteristics).

Figure 5:
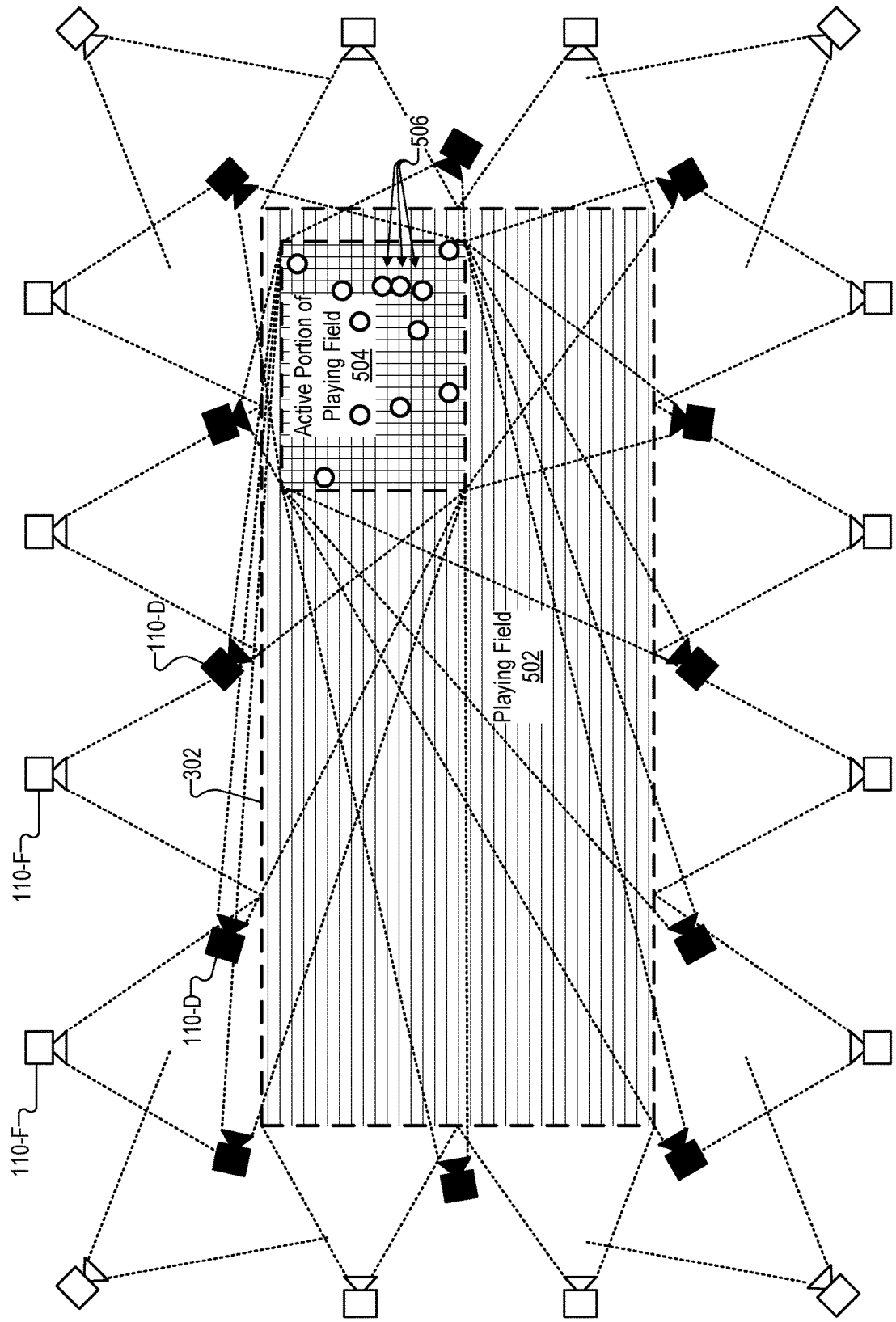
FIG. 5 shows an illustrative capture target that is captured by a fixed camera system and that includes an illustrative portion captured by a dynamic camera system.

FIG. 5 shows an illustrative implementation of capture target 302 being captured by a fixed camera system, as well as a specific portion of that capture target 302 being captured by a dynamic camera system that is used in combination with the fixed camera system. More particularly, as shown, capture target 302 is implemented in FIG. 5 by a playing field 502 that is outlined with a dashed line and shaded in using a horizontal fill pattern. Playing field 502 may represent a playing field for any suitable sporting event including, as a few examples, a football field for an American football game, a soccer field for a soccer game, a basketball court for a basketball game, and so forth.

Surrounding playing field on all four sides is an implementation of fixed camera system 108-F comprising various image capture devices 110-F (a few of which are explicitly labeled and all of which are drawn with a white fill pattern), as well as an implementation of dynamic camera system 108-D comprising various image capture devices 110-D (a few of which are explicitly labeled and all of which are drawn with a black fill pattern). As shown, the image capture devices 110-F of fixed camera system 108-F are arranged in an outer ring around playing field 502 while the image capture devices 110-D of dynamic camera system 108-D are arranged in an inner formation around playing field 502. It will be understood that these formations are shown as one example, but other implementations of camera systems 108 may use other formations (e.g., formations with other shapes, formations in which cameras from each camera system are co-located at each position, formations that do not entirely surround the capture target on all sides, etc.).

Also shown in FIG. 5 is an active portion 504 of playing field 502, which is also outlined with a dashed line and, along with using the horizontal fill pattern, also is overlaid with a vertical fill pattern. It will be understood that playing field 502 may represent an entirety of capture target 302, while active portion 504 may represent a portion of capture target 302 less than the entirety of capture target 302. Within active portion 504, various small circles represent a plurality of players 506 (only a few of which are explicitly labeled in FIG. 5) that are engaged in the sporting event on playing field 502. As a result of conditions in the game at the time illustrated in FIG. 5, all of players 506 happen to be contained within a fairly small portion of playing field 502, leaving the rest of playing field 502 currently devoid of any players 506.

All of the image capture devices 110-F of the fixed camera system 108-F and the image capture devices 110-D of the dynamic camera system 108-D are shown to have viewpoints represented by respective dotted lines extending outward from the capture devices. As shown, while the fixed-viewpoint image capture devices 110-F are uniform (e.g., each is aligned to face playing field 502 straight on from their equally distributed positions, each has a same focal length as the others, etc.) and configured to collectively cover the entirety of playing field 502, the dynamic-viewpoint image capture devices 110-D vary from camera to camera (e.g., each oriented toward active portion 504 rather than facing playing field 502 straight on, each having different focal lengths so as to effectively cover active portion 504, etc.) so as to effectively capture a high level of detail within active portion 504 (even at the expense of the rest of playing field 502).

While, as has been described, the fixed viewpoints of image capture devices 110-F may remain static during a capture period (e.g., during the sporting event being captured on playing field 502), the dynamic viewpoints of image capture devices 110-D may dynamically change during the capture period to continually follow players 506 and the action of the game. For example, in certain implementations, human operators may control image capture devices 110-D, pointing the cameras toward the action of the game (e.g., following the ball as it goes up and down the field), zooming in on the action, and so forth. Additionally or alternatively, some or all of image capture devices 110-D may be controlled by system 100 or another automated controller configured to track players 506 as they move around within playing field 502 and to direct the viewpoints of image capture devices 110-D to capture the players and/or the active areas of the field where action is occurring.

Any suitable factors may be considered and/or any suitable objectives may be targeted in the decision-making process of how dynamic viewpoints are to be directed, whether that decision-making process is performed by human camera operators, automated processes, or a combination of the two. Put another way, any of various factors and/or objectives may be accounted for in a particular implementation as the portion of the capture target (e.g., active portion 504 of playing 502 in this example) is defined and continually redefined.

As a first example, system 100 or another manual or automated controller may dynamically define the portion of the capture target to be captured by dynamic camera system 108-D (e.g., active portion 504 of playing field 502) based on a minimum pixel density threshold. For instance, system 100 may be configured to ensure that each volumetric representation that is to be produced (e.g., for each of players 506) is formed using capture data having at least a certain pixel density, and, at least to the extent possible, may direct the viewpoints of image capture devices 110-D to ensure that such capture data (i.e., having at least the threshold pixel density) is continually being captured for each player 506. As such, even if fixed-viewpoint image capture devices 110-F fail to capture the threshold pixel density for certain sides of certain objects, dynamic camera system 108-D may be used to zoom in and capture the desired detail (i.e., as defined by the minimum pixel density threshold) for these sides of these objects.

As another example, system 100 or another manual or automated controller may dynamically define the portion of the capture target to be captured by dynamic camera system 108-D (e.g., active portion 504 of playing field 502) at a particular time to be a portion of the scene (e.g., of playing field 502) in which an entirety of a set of human subjects (e.g., all of players 506) is located at the particular time. For example, in this type of implementation, active portion 504 may be thought of as a bubble that moves, expands, and contracts so as to always contain all of the relevant human subjects and/or other objects in a scene (e.g., all of players 506 in this example).

Figure 6:
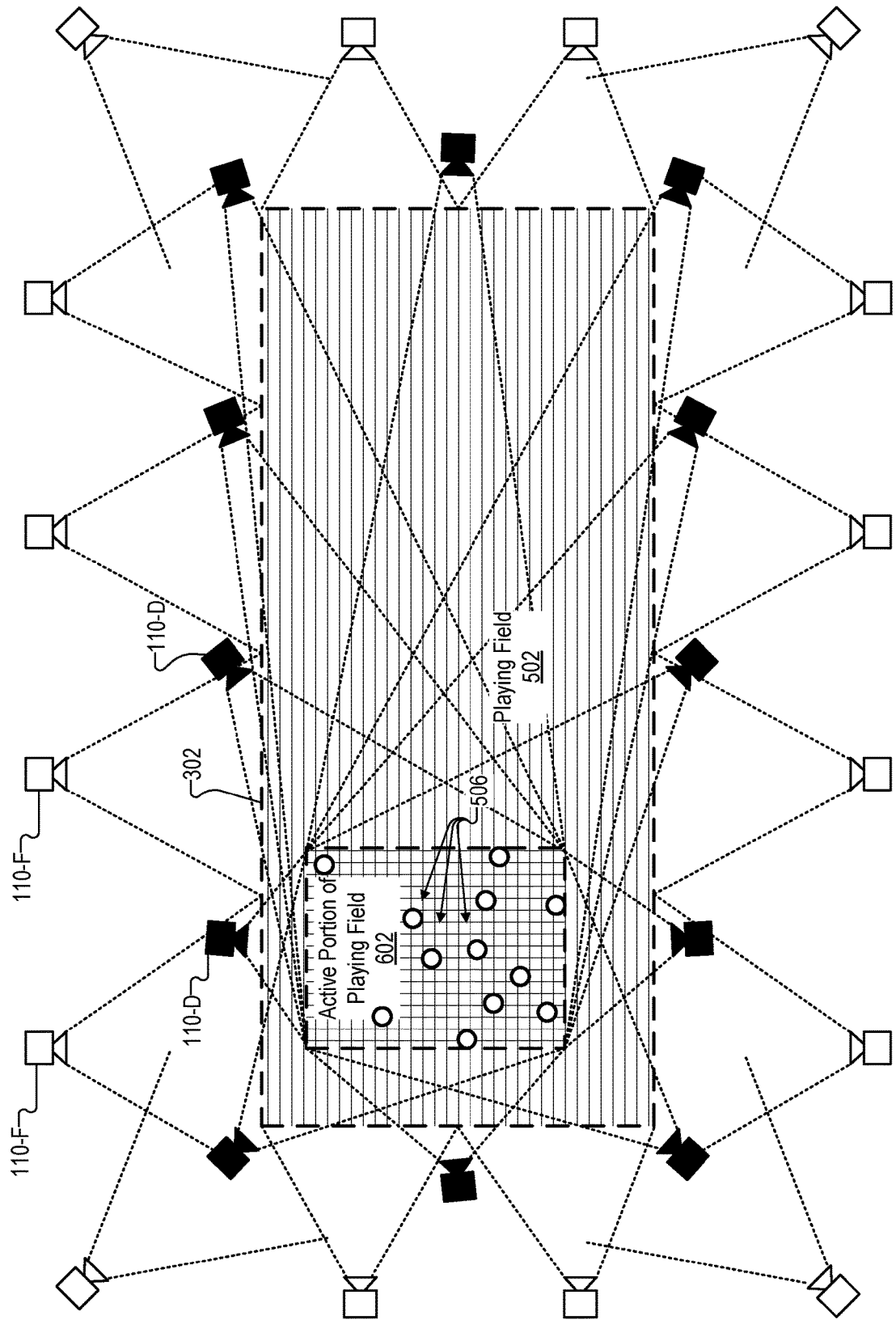
FIG. 6 shows another example portion of the capture target of FIG. 5 that is captured at a different time by the dynamic camera system.

To illustrate, FIG. 5 shows that active portion 504 is narrowly defined so as to include each of players 506 in their current locations at the moment in time represented. Then, as illustrated in FIG. 6, this bubble of active portion 504 may be redefined at a later point in time as an active portion 602 of playing field 502. As shown, active portion 602 has a different shape than active portion 504 and is located at a different part of playing field 502, but still includes all of the players 506. This is because, just as with active portion 504, active portion 602 is defined as a rectangular area that includes all of players 506 (and the action of the game has now caused players 506 to move down closer to the other side of playing field 502). It will be understood that these active portions of playing field 502 are provided only by way of illustration, and that, in certain implementations, active portions of a capture target may have other shapes (non-rectangular), less well-defined boundaries, and so forth.

Yet another example of how various factors and/or objectives may be served in the defining of the portion of the capture target (e.g., active portion 504 of playing 502 in this example), system 100 or another manual or automated controller may dynamically define the portion of the capture target to be captured by dynamic camera system 108-D (e.g., active portion 504 of playing field 502) at a particular time to be a portion of the scene (e.g., of playing field 502) that includes, at the particular time, a subset of the set of human subjects (i.e., a subset having less than an entirety of the set of human subjects, such as some but not all of players 506). This type of implementation may result in a similar effect as the implementation illustrated in FIGS. 5-6, but may be slightly more flexible to allow for an active portion to be defined that does not have to include all the players. For example, a few players that may be of less interest (e.g., that are not actively involved in the main action of the game) may be located outside this type of active portion of the capture target, such that volumetric representations generated for these players may be based on capture data with lower pixel density. However, this tradeoff may be considered acceptable due to relatively low relevance of these players to the game at the time.

As has been mentioned, one purpose of generating volumetric representations of real-world objects using volumetric content production systems such as system 100 is to ultimately produce extended reality content for users to view in extended reality experiences. To this end, after generating a volumetric representation of an object within a capture target (e.g., a volumetric representation of a human subject within a scene being captured, a volumetric representation of a body part on a human body being captured, etc.), system 100 may generate an extended reality scene that includes the volumetric representation of the object, and may provide data representing this scene to a XR presentation device (e.g., XR presentation device 306) for presentation to a user (e.g., user 308), as described and illustrated above.

Several aspects of an object within a capture target may be captured and analyzed to generate an effective volumetric representation of the object and to integrate this volumetric representation into an extended reality scene. For example, system 100 may analyze the position of the object with respect to the scene, the posture of the object (e.g., how its joints are configured, how it is oriented in space, etc.), graphical content defining an appearance or texture of the object (e.g., including color and texture detail, complex behaviors of certain parts of the object such as hair and clothing of a human subject, etc.), and so forth. One advantage of producing volumetric content using combined fixed and dynamic camera systems in the ways described herein, is that the fixed and dynamic camera systems may complement one another in the capture process, as capture data received from each of these camera systems may excel in relation to different aspects from this list. For example, when system 100 generates a volumetric representation of an object and an extended reality scene to include this volumetric representation, a position of the volumetric representation of the object within the extended reality scene may be based on first capture data accessed from a fixed camera system (e.g., fixed camera system 108-F), graphical content of the volumetric representation of the object may be based on second capture data accessed from a dynamic camera system (e.g., dynamic camera system 108-D), and a posture of the volumetric representation of the object may be based on both the first capture data and the second capture data.

In this way, capture data accessed from the fixed camera system may help to provide an overall context of objects' placement in the scene using the unchanging and wider-angle (i.e., shorter focal length) fixed viewpoints of the image capture devices of the fixed camera system. These image capture devices of the fixed camera system may employ body and joint tracking, body mapping (e.g., Densepose), and object shape libraries to track the position of objects in the scene space. At the same time, capture data from the dynamic camera system may provide more flexibility in camera angles and focal lengths to thereby enable consistent pixel density across camera viewpoints. For instance, the ability to zoom the viewpoints of these image capture devices enables the capture of higher resolution object textures, shapes, and sizes.

Figure 7:
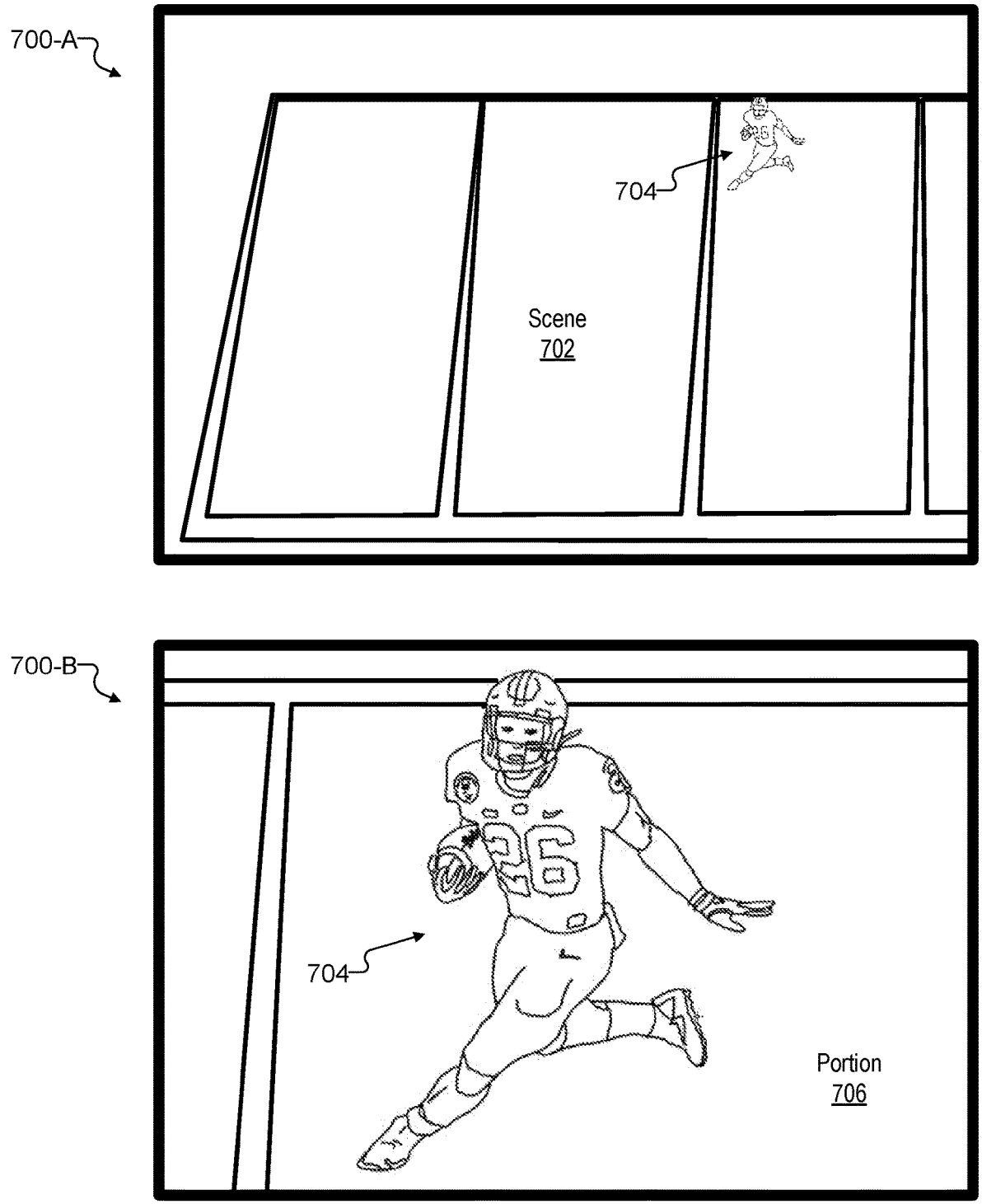
FIG. 7 shows illustrative image content represented by different instances of capture data captured by different image capture devices in different types of camera systems.

To illustrate these principles, FIG. 7 shows example image content represented by different instances of capture data (e.g., capture data 112-1 and 112-2) captured by different image capture devices in different types of camera systems. Specifically, an image 700-A will be understood to depict image content that is represented by capture data captured by a fixed-viewpoint image capture device in an example fixed camera system (e.g., capture data 112-1 from one of image capture devices 110-F in fixed camera system 108-F). As shown, image 700-A is captured from a wide-angle viewpoint associated with a short focal length so as to capture a large portion of a scene 702 (e.g., a playing field, in this example). It will be understood that, together with other fixed viewpoints of other image capture devices in the fixed camera system, an entirety of scene 702 may be captured in the ways that have been described and illustrated (e.g., with respect to playing field 502 in FIGS. 5 and 6). Advantageously, the image 700-A captured from this fixed viewpoint makes it easy to discern where a human subject 704 (e.g., a football player in this example) is located with respect to scene 702. While human subject 704 is the only object shown in this view of the scene for simplicity in this example, it will be understood that this wide contextual view would facilitate differentiating human subject 704 from other nearby human subjects and/or other objects in the scene.

Below image 700-A in FIG. 7, an image 700-B will be understood to depict image content that is represented by capture data captured by a dynamic-viewpoint image capture device in an example dynamic camera system (e.g., capture data 112-2 from one of image capture devices 110-D in dynamic camera system 108-D). As shown, image 700-B is captured from a more zoomed-in viewpoint associated with a long focal length so as to capture more detail (a higher pixel density) of human subject 704 in a portion 706 of scene 702. It will be understood that, together with other dynamic viewpoints of other image capture devices in the dynamic camera system, human subject 704 (and portion 706 more generally) may be captured so that detailed content (e.g., satisfying a minimum pixel density threshold in certain examples) for the human subject will be available to system 100 for generating a volumetric representation of the human subject. Though this dynamic viewpoint may not especially facilitate discerning where human subject 704 is located with respect to scene 702 (as does the fixed viewpoint of image 700-A), the image content captured from this dynamic viewpoint complements image content captured from the fixed viewpoint by providing significantly more detail and pixel density useful for generating a volumetric representation of the player.

Accordingly, system 100 may be configured to combine first capture data (associated with fixed-viewpoint content like image 700-A) with second capture data (associated with dynamic-viewpoint content like image 700-B) to generate a detailed volumetric representation of human subject 704 and to properly pose (i.e., position and posture) the volumetric representation in an extended reality scene corresponding to scene 702. To this end, calibration between the fixed and dynamic camera systems may be executed through correspondence of joint tracking angles, body mapping poses, object key feature angles between viewpoint from the two camera systems, and so forth. This calibration may then be adjusted for ongoing changes in viewpoint (e.g., focal length and angle) of the image capture devices in the dynamic camera system relative to the image capture devices in the fixed camera system. Based on this calibration, first and second capture data originating from the different camera systems may be correlated in any suitable way so as to be used in the generation of volumetric extended reality content. This correlation may be performed by way of joint tracking, body tracking, object recognition, machine learning, and/or other suitable techniques. For instance, in this example in which the object included in the portion of the capture target (i.e., portion 706 of scene 702) is human subject 704, the generating of the volumetric representation of human subject 704 by system 100 may include correlating image data associated with the human subject from the first and second capture data, and tracking human subject 704 in the correlated image data using a joint tracking algorithm.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium (e.g., a memory, etc.), and executes those instructions, thereby performing one or more operations such as the operations described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random-access memory (DRAM), which typically constitutes a main memory. Common forms of computer-readable media include, for example, a disk, hard disk, magnetic tape, any other magnetic medium, a compact disc read-only memory (CD-ROM), a digital video disc (DVD), any other optical medium, random access memory (RAM), programmable read-only memory (PROM), electrically erasable programmable read-only memory (EPROM), FLASH-EEPROM, any other memory chip or cartridge, or any other tangible medium from which a computer can read.

Figure 8:
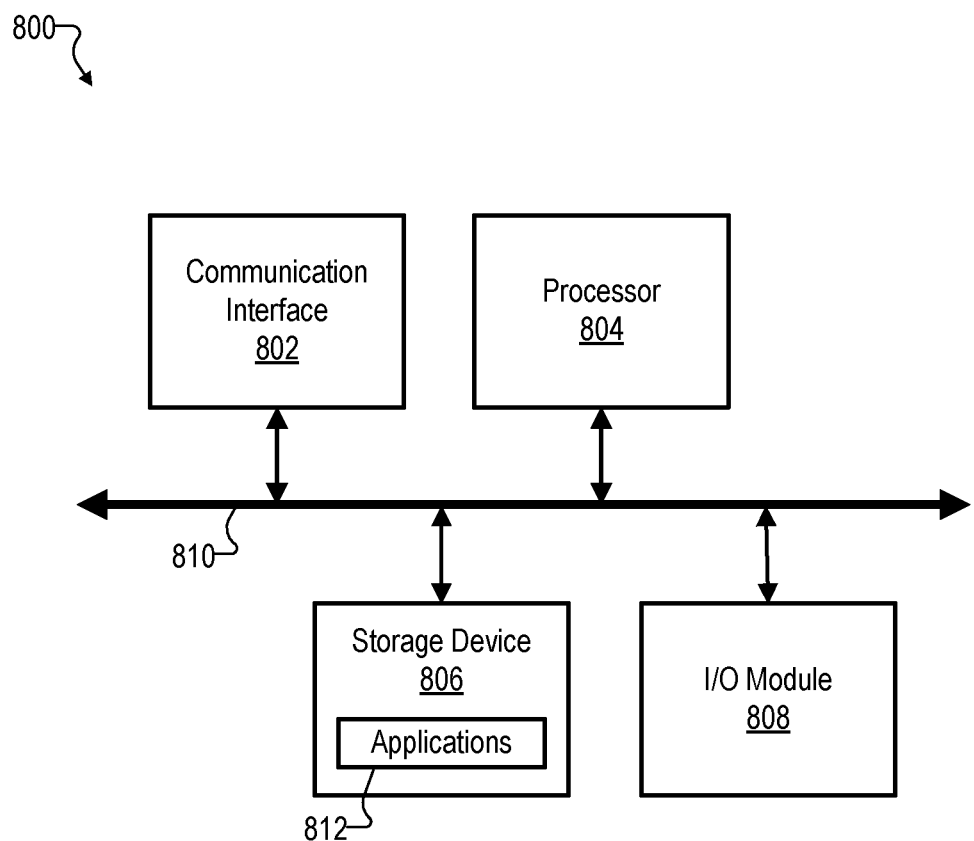
FIG. 8 shows an illustrative computing device that may implement volumetric content production systems and/or other computing systems and devices described herein.

FIG. 8 shows an illustrative computing device 800 that may implement volumetric content production systems and/or other computing systems and devices described herein. For example, computing device 800 may include or implement (or partially implement) a volumetric content production system such as system 100, a camera system such as either of camera systems 108, a client device such as XR presentation device 306, certain elements of a network such as network 304, and/or any other computing devices or systems described herein (or any elements or subsystems thereof).

As shown in FIG. 8, computing device 800 may include a communication interface 802, a processor 804, a storage device 806, and an input/output (I/O) module 808 communicatively connected via a communication infrastructure 810. While an illustrative computing device 800 is shown in FIG. 8, the components illustrated in FIG. 8 are not intended to be limiting. Additional or alternative components may be used in other embodiments. Components of computing device 800 shown in FIG. 8 will now be described in additional detail.

Communication interface 802 may be configured to communicate with one or more computing devices. Examples of communication interface 802 include, without limitation, a wired network interface (such as a network interface card), a wireless network interface (such as a wireless network interface card), a modem, an audio/video connection, and any other suitable interface.

Processor 804 generally represents any type or form of processing unit capable of processing data or interpreting, executing, and/or directing execution of one or more of the instructions, processes, and/or operations described herein. Processor 804 may direct execution of operations in accordance with one or more applications 812 or other computer-executable instructions such as may be stored in storage device 806 or another computer-readable medium.

Storage device 806 may include one or more data storage media, devices, or configurations and may employ any type, form, and combination of data storage media and/or device. For example, storage device 806 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 806. For example, data representative of one or more executable applications 812 configured to direct processor 804 to perform any of the operations described herein may be stored within storage device 806. In some examples, data may be arranged in one or more databases residing within storage device 806.

I/O module 808 may include one or more I/O modules configured to receive user input and provide user output. One or more I/O modules may be used to receive input for a single virtual experience. I/O module 808 may include any hardware, firmware, software, or combination thereof supportive of input and output capabilities. For example, I/O module 808 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 808 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 800. For example, one or more applications 812 residing within storage device 806 may be configured to direct processor 804 to perform one or more processes or functions associated with processor 104 of system 100. Likewise, memory 102 of system 100 may be implemented by or within storage device 806.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

In the preceding description, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method comprising:
accessing, by a volumetric content production system, first capture data representing an entirety of a capture target and captured by a fixed camera system including a first plurality of image capture devices having respective fixed viewpoints with respect to the capture target;
accessing, by the volumetric content production system, second capture data representing a dynamic portion of the capture target less than the entirety of the capture target and captured by a dynamic camera system including a second plurality of image capture devices having respective dynamic viewpoints with respect to the capture target, wherein the dynamic camera system is configured to be dynamically calibrated with the fixed camera system based on ongoing changes between the fixed viewpoints and the dynamic viewpoints;
combining, by the volumetric content production system, the first capture data and the second capture data to generate combined capture data; and
generating, by the volumetric content production system based on the combined capture data, a volumetric representation of an object included in the dynamic portion of the capture target.

2. The method of claim 1, wherein each image capture device in the second plurality of image capture devices is configured to:
dynamically change the dynamic viewpoint of the image capture device by way of a panning action, a tilting action, and a zooming action; and
track and provide state data associated with the dynamic viewpoint of the image capture device during a performance of the panning action, the tilting action, or the zooming action.

3. The method of claim 2, further comprising:
at a first time prior to the performance of the panning action, the tilting action, or the zooming action, calibrating the dynamic camera system to determine an initial set of calibration parameters for each of the second plurality of image capture devices; and
at a second time subsequent to the performance of the panning action, the tilting action, or the zooming action, dynamically recalibrating the dynamic camera system to determine, based on the state data, a revised set of calibration parameters for each of the second plurality of image capture devices.

4. The method of claim 1, further comprising dynamically defining, by the volumetric content production system, the portion of the capture target to be captured by the dynamic camera system based on a minimum pixel density threshold.

5. The method of claim 1, wherein:
the object included in the portion of the capture target is a human subject; and
the generating of the volumetric representation of the object includes:
correlating image data associated with the human subject from the first and second capture data, and
tracking the human subject in the correlated image data using a joint tracking algorithm.

6. The method of claim 1, wherein:
the first and second pluralities of image capture devices are implemented by image capture devices configured to capture color and depth data; and
the first and second capture data accessed by the volumetric content production system includes color and depth data.

7. The method of claim 1, further comprising providing, by the volumetric content production system, the volumetric representation of the object for presentation within an extended reality experience that is presented to a user by way of an extended reality (XR) presentation device used by the user.

8. The method of claim 1, wherein:
the capture target is a scene that includes a set of human subjects;
the portion of the capture target at a particular time is a portion of the scene in which an entirety of the set of human subjects is located at the particular time; and
the volumetric representation of the object is a volumetric representation of one human subject from the set of human subjects.

9. The method of claim 8, wherein:
the scene is a playing field on which a sporting event is being played; and
the set of human subjects includes a plurality of players engaged in the sporting event on the playing field.

10. The method of claim 1, wherein:
the capture target is a scene that includes a set of human subjects;
the portion of the capture target at a particular time is a portion of the scene that includes a subset of the set of human subjects having less than an entirety of the set of human subjects; and
the volumetric representation of the object is a volumetric representation of one human subject from the set of human subjects.

11. The method of claim 1, wherein:
the capture target is a body of a human subject;
the portion of the capture target at a particular time is a body part of the human subject; and
the volumetric representation of the object is a volumetric representation of the body part of the human subject.

12. The method of claim 1, wherein a posture of the volumetric representation of the object is based on both the first capture data and the second capture data.

13. A system comprising:
a memory storing instructions; and
one or more processors communicatively coupled to the memory and configured to execute the instructions to perform a process comprising:

accessing first capture data representing an entirety of a capture target and captured by a fixed camera system including a first plurality of image capture devices having respective fixed viewpoints with respect to the capture target;

accessing second capture data representing a dynamic portion of the capture target less than the entirety of the capture target and captured by a dynamic camera system including a second plurality of image capture devices having respective dynamic viewpoints with respect to the capture target, wherein the dynamic camera system is configured to be dynamically calibrated with the fixed camera system based on ongoing changes between the fixed viewpoints and the dynamic viewpoints;

combining the first capture data and the second capture data to generate combined capture data; and generating, based on the combined capture data, a volumetric representation of an object included in the dynamic portion of the capture target.

14. The system of claim 13, wherein each image capture device in the second plurality of image capture devices is configured to:

dynamically change the dynamic viewpoint of the image capture device by way of a panning action, a tilting action, and a zooming action; and track and provide state data associated with the dynamic viewpoint of the image capture device during a performance of the panning action, the tilting action, or the zooming action.

15. The system of claim 13, wherein the process further comprises dynamically defining the portion of the capture target to be captured by the dynamic camera system based on a minimum pixel density threshold.

16. The system of claim 13, wherein:

the first and second pluralities of image capture devices are implemented by image capture devices configured to capture color and depth data; and the first and second capture data accessed by the system includes color and depth data.

17. The system of claim 13, wherein the process further comprises providing the volumetric representation of the object for presentation within an extended reality experience that is presented to a user by way of an extended reality (XR) presentation device used by the user.

18. The system of claim 13, wherein:

the capture target is a scene that includes a set of human subjects;

the portion of the capture target at a particular time is a portion of the scene in which an entirety of the set of human subjects is located at the particular time; and the volumetric representation of the object is a volumetric representation of one human subject from the set of human subjects.

19. A system comprising:

a fixed camera system including a first plurality of image capture device having respective fixed viewpoints with respect to a capture target;

a dynamic camera system including a second plurality of image capture devices having respective dynamic viewpoints with respect to the capture target, wherein the dynamic camera system is configured to be dynamically calibrated with the fixed camera system based on ongoing changes between the fixed viewpoints and the dynamic viewpoints; and one or more processors configured to perform a process comprising:

accessing, from the fixed camera system, first capture data representing an entirety of a capture target, accessing, from the dynamic camera system, second capture data representing a dynamic portion of the capture target less than the entirety of the capture target, combining the first capture data and the second capture data to generate a combined capture data, and generating, based on the combined capture data, a volumetric representation of an object included in the dynamic portion of the capture target.

20. The system of claim 19, wherein each image capture device in the second plurality of image capture devices is configured to:

dynamically change the dynamic viewpoint of the image capture device by way of a panning action, a tilting action, and a zooming action; and track and provide state data associated with the dynamic viewpoint of the image capture device during a performance of the panning action, the tilting action, or the zooming action.

* * * * *